(12) United States Patent
Lonati

(10) Patent No.: US 7,448,234 B2
(45) Date of Patent: Nov. 11, 2008

(54) LINEAR KNITTING MACHINE

(75) Inventor: Tiberio Lonati, Brescia (IT)

(73) Assignee: Santoni S.p.A., Brescia (IT)

( * ) Notice: Subject to any disclaimer, the term of this patent is extended or adjusted under 35 U.S.C. 154(b) by 0 days.

(21) Appl. No.: 11/601,225

(22) Filed: Nov. 17, 2006

(65) Prior Publication Data

US 2007/0113590 A1 May 24, 2007

(30) Foreign Application Priority Data

Nov. 23, 2005 (IT) .......................... BS2005A0146

(51) Int. Cl.
*D04B 15/06* (2006.01)
(52) U.S. Cl. .......................................... 66/109; 66/110
(58) Field of Classification Search .................... 66/203, 66/204, 206, 207, 208, 99, 104, 109, 110
See application file for complete search history.

(56) References Cited

U.S. PATENT DOCUMENTS

| | | | | | |
|---|---|---|---|---|---|
| 2,686,409 | A | * | 8/1954 | Zwingenberger | .............. 66/203 |
| 2,700,285 | A | * | 1/1955 | Bellini | ......................... 66/208 |
| 3,063,273 | A | * | 11/1962 | Kohl | ............................ 66/208 |
| 3,864,943 | A | * | 2/1975 | Wunner | ...................... 66/84 A |
| 3,898,820 | A | * | 8/1975 | Brand | ......................... 66/195 |
| 4,263,791 | A | | 4/1981 | Hittel | |
| 4,986,091 | A | * | 1/1991 | Jager | ........................... 66/84 R |
| 5,901,583 | A | * | 5/1999 | Kemper et al. | .................. 66/207 |

FOREIGN PATENT DOCUMENTS

DE 813 741 C 9/1951

OTHER PUBLICATIONS

European Search Report for EPO App. No. 06119916.2-2314, European Patent Office, Dec. 19, 2007, pp. 1-6.

* cited by examiner

*Primary Examiner*—Danny Worrell
(74) *Attorney, Agent, or Firm*—Pearne & Gordon LLP

(57) ABSTRACT

A linear knitting machine (1) comprising a machine frame, at least one needlebed (3) associated with the machine frame, a plurality of needles (4) sliding in the needlebed (3), means for feeding the needles (4) with a yarn for building a new stitch and holding-down means (8) cooperating with said needles (4) on the needlebed (3) and moving between a forward position, which occurs when the needle (4) is lifted, in which they act upon said stitch so as to keep it on the stem (5) of the needle (4), and a rear position, when the needle (4) gets down, in which they do not act upon the stitch. The machine (1) is characterized in that it further comprises holding means (15) fastened to the machine frame and discharging means (19), associated with the holding-down means (8), which can be engaged with said holding means (15) in forward position for discharging onto the machine frame the force generated by the holding-down means (8) when keeping the stitch, and which can be disengaged from the holding means (15) in rear position.

22 Claims, 5 Drawing Sheets

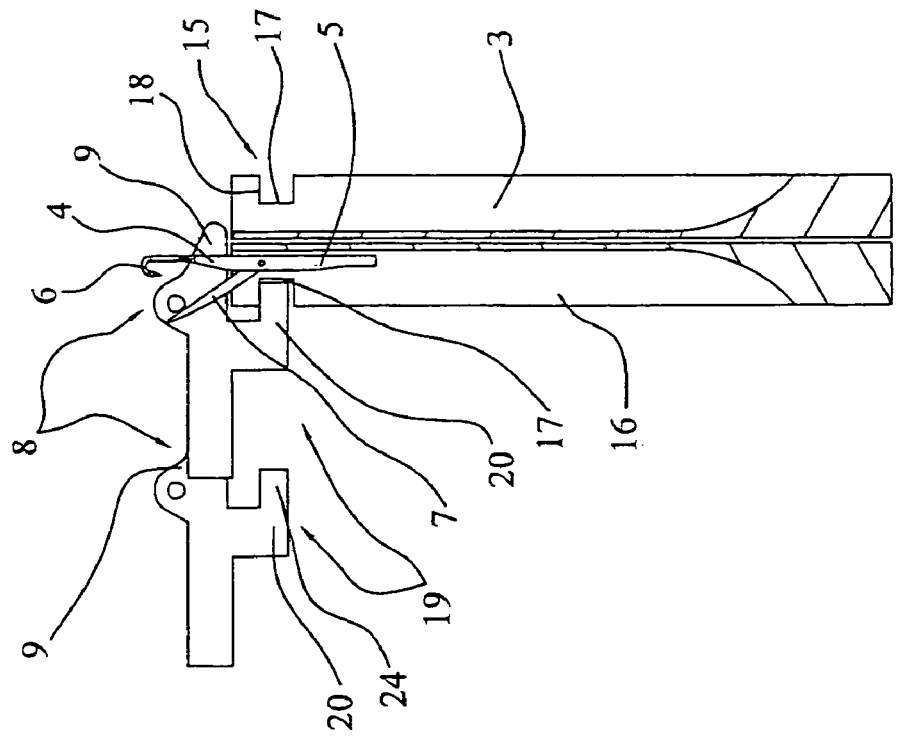
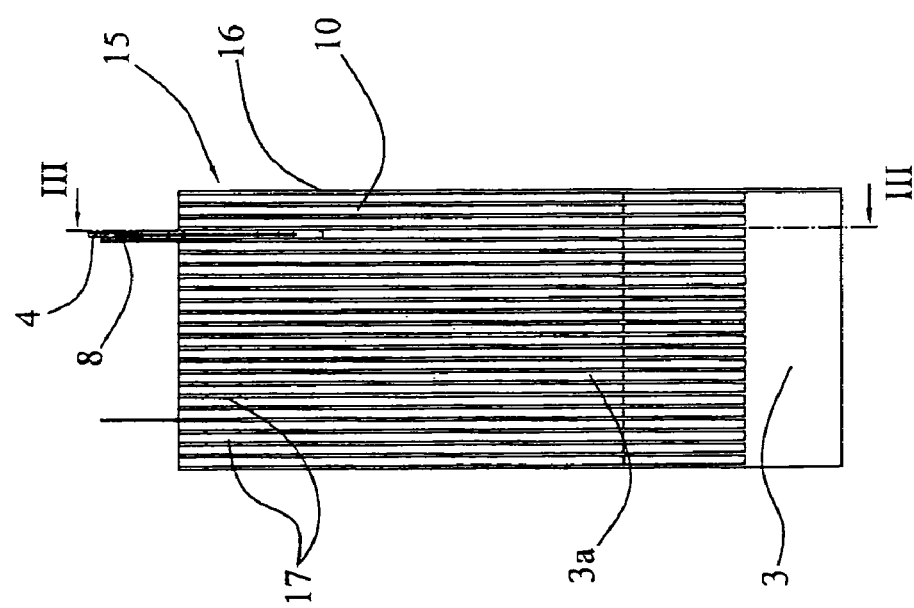

LINEAR KNITTING MACHINE

FIELD OF THE INVENTION

The present invention relates to a Raschel-type linear knitting machine, commonly also known as Raschel-type warp machine and used for manufacturing textile items of any type.

BACKGROUND OF THE INVENTION

The peculiar feature of known warp machines consists in that the fabric that has just been formed is pulled downwards by means of suitable take-down devices, so that because of friction the old loop is not lifted together with the needle, which is going to take the new yarn, but is left in a lowered position so as to be discharged in its turn from the needle and leave space on the stem for the new loop that has just been formed. Moreover, thanks to the take-down action the loop adhering to the needle is able to rotate the needle latch when said needle moves downwards so as to close the jack carrying new yarn, thus enabling it to discharge the old knitting stitch and to form a new loop (in the case of a latch needle).

As is known, take-down devices comprise at least two rollers, which by means of pressure keep and take down the knitted fabric on its whole length, exerting a force opposed to the upward movement of the needle. As a rule, rollers have a smooth surface, preferably made of rubber, so as not to spoil the fabric undergoing take-down and ensure a uniform traction on the whole piece length. However, rollers actually rotate at a constant speed whereas the piece is formed "jerkily", i.e. when needles get down and discharge stitches. As a consequence, the fabric is taken down even when no new loops are formed. This imbalance of the force of traction is partly counterbalanced by fabric elasticity, however the pressure exerted by rollers cannot be high so as not to result in permanent fabric deformations. Consequently, when needles get up to take new yarn and force the loop wound on its stem to get up, they are prevented from doing so by the take-down action, though part of the fabric wound on the rollers is pulled upwards because of elasticity and sliding between the rollers.

This phenomenon is very dangerous as far as the fabric-building process is concerned and results in poor quality and even needle breaks when needles do not manage to discharge the old stitch and still take new stitches. In known machines this drawback was solved first by strongly limiting manufacturing speed, since the faster the needle is lifted, the more the loop adheres to its stem since it has not time to slide on the latter. Known machines were then equipped with holding-down elements, which fit in between the needles and prevent the stitch to get up along the stem beyond a given extent. This element is commonly known as "stitch-comb" and is applied under different forms to looms equipped both with latch needles and with compound needles. It should be pointed out that in latch needles the latch is integral with the needle by means of a hinge pin enabling rotation on it, whereas in compound needles needle and latch are separate and are to be moved individually. As is known, a warp machine comprises as many holding-down elements as needles. Each element acts upon a needle basically on the knock-over plane of the needlebed, preferably slightly above it, so as to track down loop welts and prevent them from getting up with the needle. Each holding-down element is further shifted forward so as to keep the loop on the needle stem when the needle begins to be lifted, starting from the lower dead center of its stroke, and stays in this position until the needle has achieved its upward movement. Said elements now get backwards so that the needle gets down and forms a new stitch.

Forces acting on each holding-down element when keeping the stitch in a lowered position are small, about few hectograms and mainly depend on yarn type and knitting density.

Generally, holding-down elements are mounted onto bars (one for single-needlebed machines and two for double-needlebed machines), which are movably connected to the machine frame for instance by means of two arms. However, known machines have some drawbacks.

Warp machines are equipped with up to more than three thousand needles per needlebed, which are arranged on a bar of more than three and a half meters of length and, moving simultaneously, discharge the force of friction setting in with the loops just formed onto the bar carrying in its turn more than three thousand holding-down elements. As a consequence, the total force discharged onto the bar of holding-down elements (which is the sum of the force per needle for the number of needles moving simultaneously) reaches very high values, i.e. some hundreds of kilos. Consequently, bars carrying holding-down elements should be very strong in order to bear such an intense stress.

Moreover, so as to prevent the bar of holding-down elements from bending in its effort to prevent loops from getting up, lever arms are arranged about every half meter, thus increasing machine cost and complexity. Thus, for instance, 8 arms are applied on a 3.5 meter bar if the machine is single-needlebed, whereas 16 are present if it is double-needlebed.

Such oversize of the bar carrying holding-down elements requires a machine with strong and heavy structure so as to support and move these elements at a given speed. However, operating speeds are still small because of the forces of inertia due to the high masses involved. Therefore, beyond strong disadvantages as far as manufacturing costs are concerned, there are also strong disadvantages concerning the final operating speed of the machine.

In order not to load the structure of the bar carrying holding-down elements too much, the take-down system is modified by bringing its pressure between rollers and its rotation speed to the limit which the fabric can bear, which results, as is well known, in risks involving breaks or permanent deformations.

BRIEF SUMMARY OF THE INVENTION

The aim of the present invention is to solve the problems of prior art by proposing a linear knitting machine without the drawbacks mentioned above. In particular, an aim of the present invention is to show a linear knitting machine which has a slim structure and is therefore easier to manufacture, transport and install in the plant. As a consequence, an aim of the present invention is to provide a linear knitting machine in which the forces acting upon the various components are small, which is advantageous as far as component size and lifetime are concerned. A further aim is to propose a linear knitting machine which is easy to manufacture and has low costs. Another aim of the invention is to propose a linear knitting machine with holding-down elements that are able to cooperate with take-down devices, which should not be operated at their limit with possible fabric damage. A further aim of the invention is to propose a linear knitting machine enabling to obtain a high-quality fabric, i.e. uniform, compact and without abnormal elongations. A final aim of the present invention is to provide a linear knitting machine ensuring high speeds of use and therefore a high production in time unit.

These and other aims, as will be more evident from the following description, are achieved according to the present invention thanks to a linear knitting machine in accordance with the appended claims.

BRIEF DESCRIPTION OF THE DRAWINGS

Further characteristics and advantages of the invention will be more evident with the description of a preferred though not exclusive embodiment of the invention, disclosed to a merely indicative purpose in the following figures:

FIG. 3 shows a front view of the holding-down means of the discharging means associated with the corresponding needlebed of the linear knitting machine of FIG. 1;

FIG. 4 shows a section of the linear knitting machine of FIG. 3 according to lines IV-IV, in which holding-down elements and discharging means are in two different operating positions;

DETAILED DESCRIPTION OF THE PREFERRED EMBODIMENTS OF THE INVENTION

Figure 2:
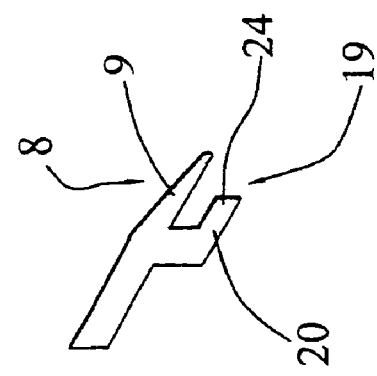
FIG. 2 shows an isometric view of the holding-down elements and of the engagement elements in a preferred embodiment of the linear knitting machine of FIG. 1.

With reference to the figures mentioned above, a linear knitting machine 1 according to the invention comprises a machine frame, at least one needlebed 3 associated with said machine frame, a plurality of needles 4 sliding in the needlebed 3 and holding-down means 8 cooperating with the needles 4 on the needlebed 3. Said means 8 can shift between a forward position, which occurs when the needle 4 is lifted in the needlebed 3, in which they act upon the stitch so as to keep it on the stem 5 of said needle 4, and a rear position, when the needle 4 gets down, in which they do not act upon the stitch, as can be seen in FIG. 4 (said figure does not show the stitch which, in the embodiment of said machine, lies between the holding-down means 8 and the needlebed 3). A linear knitting machine 1 according to the invention is characterized in that it further comprises holding means 15 fastened to the machine frame and discharging means 19 associated and integral with the holding-down means 8. Said discharging means 19 can be engaged in forward position with the holding means 15 so as to discharge onto the machine frame the force generated by the holding-down means 8 while keeping the stitch of the stem 5 of the needle 4, and can be disengaged from said holding means 15 when they are brought to the rear position.

Figure 1:
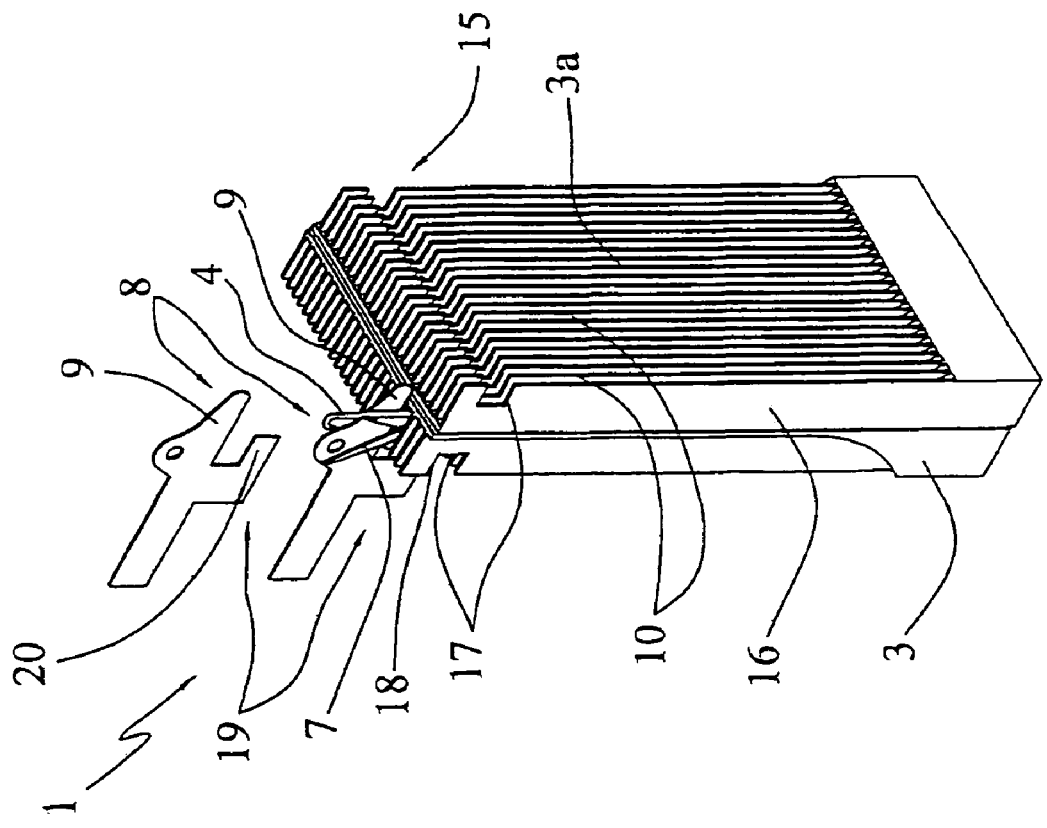
FIG. 1 shows an isometric view of holding-down means and of force-discharging means associated with a needlebed of a linear knitting machine according to the invention in accordance with a preferred embodiment.

The holding-down means 8 comprise a plurality of holding-down elements 9, each of them being designed to cooperate with one of the needles 4 of the machine 1 on the needlebed 3, and therefore on the knock-over plane, so as to perform their function of keeping the stitch on the stem 5 of the needle 4 when the latter is lifted, as shown in FIG. 1. In particular, each holding-down element fits in the space 10 between two adjacent needles 4 when it is in a forward position. As a consequence, the machine 1, as besides known machines, has the same number of holding-down elements 9 as the number of needles 4.

Figure 5A:
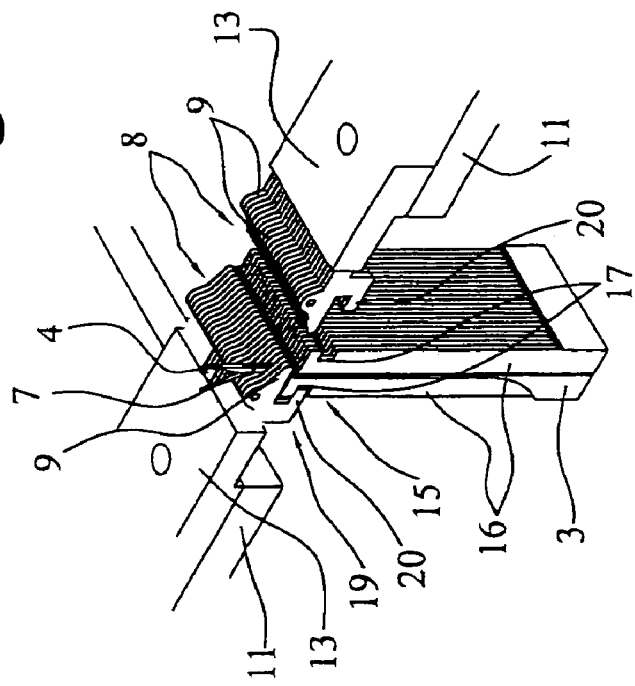
FIG. 5a shows a magnified detail of FIG. 5.
Figure 7:
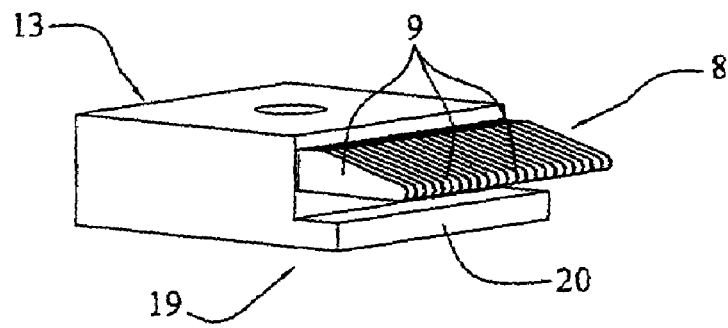
FIG. 7 shows an isometric view of a body housing the holding-down elements associated with the force-discharging means of a linear knitting machine according to the invention.

In a preferred embodiment of the invention, the holding-down means 8 further comprise a plurality of housing bodies 13, each of them being designed to contain a pre-established number of holding-down elements (FIGS. 5a and 7). Each housing body 13 contains as many holding-down elements 9 as are prescribed by the corresponding fineness: for instance, a holding body 13 having fineness 16 will contain in an inch 16 holding-down elements 9. Furthermore, the holding-down elements 9 are integral with the corresponding holding body 13 since they are melted with the latter during manufacturing.

Figure 5:
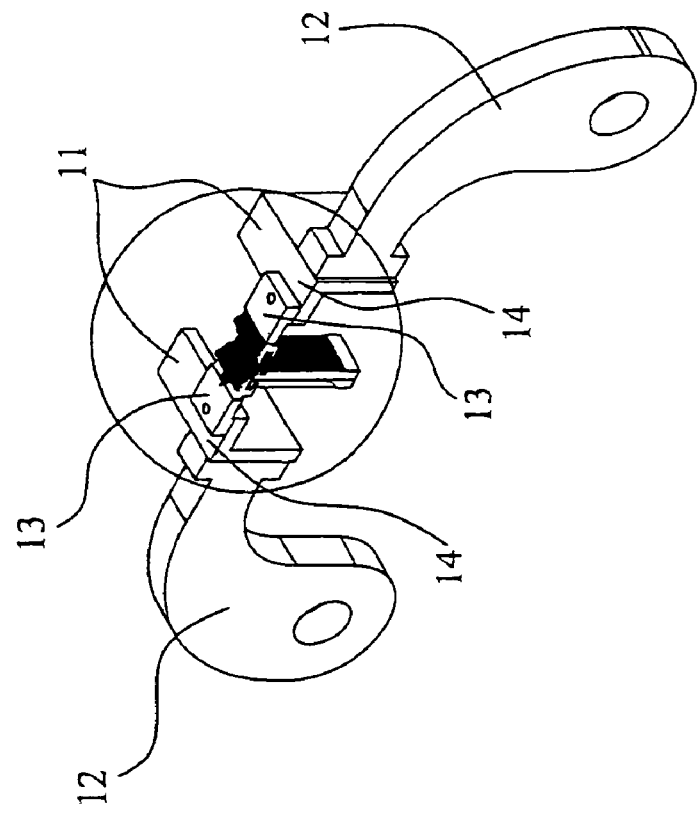
FIG. 5 shows an isometric view of bars carrying holding-down elements associated with the corresponding needlebeds of the double-needlebed linear knitting machine of FIG. 1.
Figure 6:
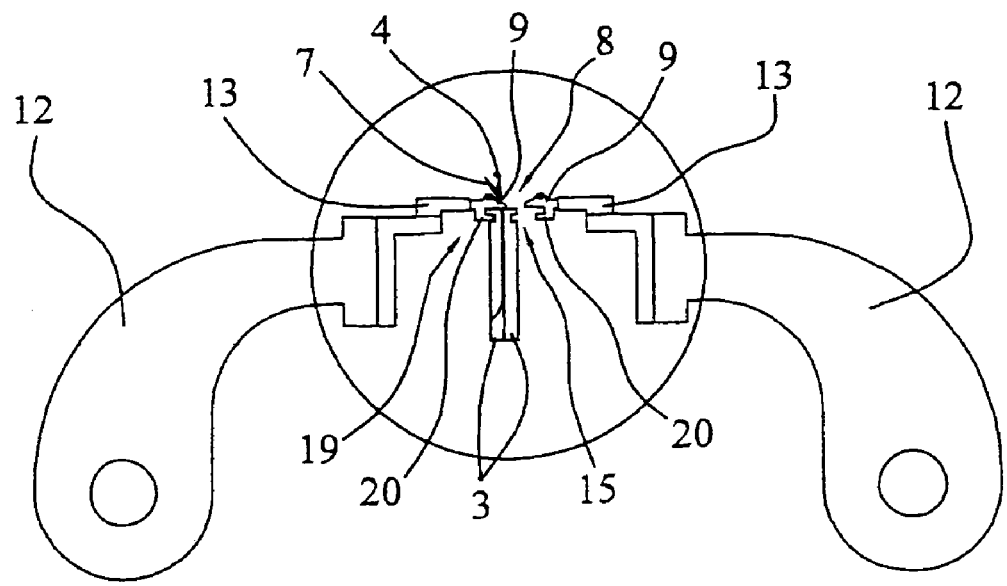
FIG. 6 shows a lateral view of the bars carrying holding-down elements associated with the corresponding needlebeds of the double-needlebed linear knitting machine of FIG. 1.
Figure 6A:
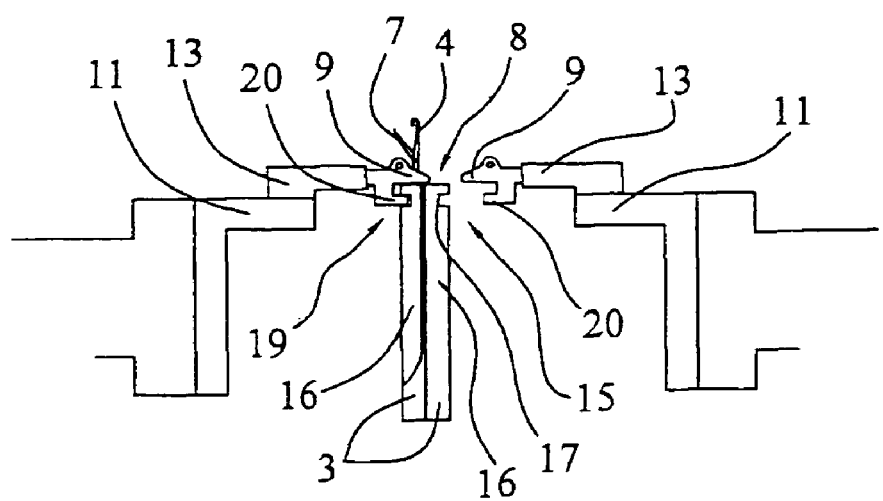
FIG. 6a shows a magnified detail of FIG. 6.

Still according to a preferred embodiment, the holding-down means 8 comprise also a bar 11 movably associated with the machine frame by means of at least one arm 12 so as to shift between the forward and the rear position by means of handling means (not shown), which can include at least one electric motor and means for transmitting motion from the motor to the arms 12. Preferably, each bar 11 is associated with two arms 12, each of them being fastened onto the end portions 14 of said bar 11, as can be seen in FIGS. 5 and 5a.

In this case, the various housing bodies 13 are connected integrally to the bar 11 and associated one with the other or one beside the other, so that the holding-down elements 9 are basically parallel to one another.

As a consequence, also the holding-down elements 9 are integral with the bar 11.

In an alternative embodiment, the holding-down elements 9 can also be fastened directly to the bar 11 without the help of housing bodies 13.

According to the invention, the discharging means 19 comprise at least one engagement element 20 associated and integral with the holding-down means 8 so as to engage with the holding means 15 in forward position. The holding means 15 comprise in their turn a stiff element 16 equipped with seats 17 into which the engagement elements 20 fit during their movement from the rear to the forward position, stay therein until the needles 4 do not stop getting up, and disengage during the movement from the forward to the rear position.

A preferred embodiment of the machine 1 comprises a plurality of engagement elements 20, each being associated with one of the holding-down elements 9 so as to engage with the holding means 15 in forward position. In further detail, each of these engagement elements 20 is made as one piece with each of the holding-down elements 9, as can be seen in the accompanying figures. Therefore, on each needle 4, when the bar 11 is brought to the forward position, there is an element having a first elongated portion acting as holding-down element 9 and keeping the stitch basically on the knock-over plane, and a second elongated portion, advantageously placed below the first one, acting as engagement element 20 and discharging the force generated by the corresponding holding-down element 9 while keeping the stitch on the stiff element 16 associated with the machine frame. Thus, the portion of the seat 17 obtained on the stiff element 16 getting in contact with the engagement element 20 represents a reaction surface 18 absorbing the upward thrust exerted by the engagement element 20 due to the force imparted by the stitch which would naturally tend to get up together with the needle 4, and enabling to discharge said force onto the machine frame locally, i.e. for every single needle 4.

The invention further comprises execution variants differing from the preferred one disclosed above.

As a matter of fact, the machine 1 can comprise at least one engagement element 20 associated with at least one of the arms 12, preferably with both arms.

Conversely, in a second execution variant, the engagement element 20 can be associated with the bar 11. For instance, it can consist of a rod connected to at least one portion of the transversal extension of said bar 11 and developing along said transversal extension so as to engage with the stiff element 16, or the bar 11 can comprise a plurality of engagement elements 20 located along its transversal extension at a pre-established distance designed to engage with the stiff element 16. Moreover, the engagement element 20 can be associated with at least one of the housing bodies 13, preferably to each of them. Here again, there can be a rod connected to the housing body 13 and extending transversally with respect to the latter, as shown in FIG. 7, or a series of engagement elements 20 placed along its transversal extension at a pre-established distance. These execution variants of the engagement elements 20 are however less efficient than the preferred one since they do not enable to discharge force uniformly onto the stiff element 16 on each needle 4.

Advantageously, the stiff element 16 can be associated with the machine frame by means of the needlebed 3. In particular, in the preferred embodiment of the invention, the stiff element 16 is made up of the needlebed 3 itself. Preferably, said needlebed 3 has on its front surface 3a a single transversal seat 17 or as many seats 17 arranged transversally as the number of needles 4 and, therefore, of engagement elements 20, so as to enable the insertion of said elements 20, as shown in FIGS. 1 to 3.

The needlebed 3 is not weakened by the addition of said seats 17 since it is suitably oversized with respect to the stress it should bear.

The engagement element 20 and its seat 17 made on the stiff element 16 can have any shape provided that the latter enables a suitable coupling between the two elements 17, 20 so as to discharge onto the stiff element 16 the force acting upon the holding-down means 8.

Figure 8:
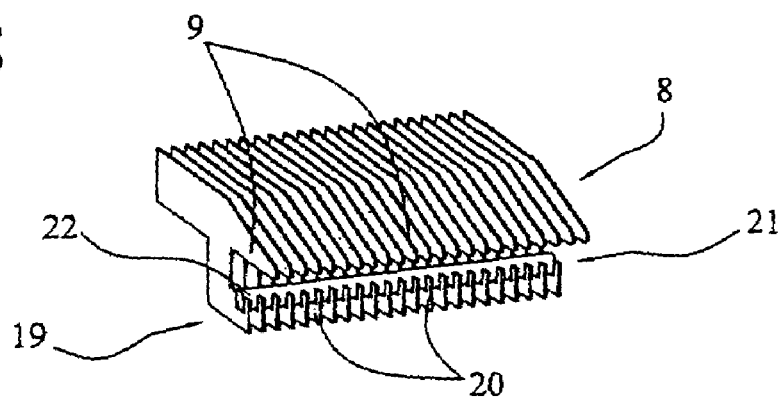
FIG. 8 shows an isometric view of the holding-down elements, of the discharging means and of the anti-deviation means in a first execution variant of the linear knitting machine according to the invention.
Figure 9A:
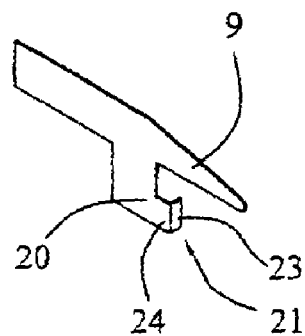
FIGS. 9a and 9b show an isometric view of a holding-down element, of the discharging means and of the anti-deviation means in a second execution variant of a linear knitting machine according to the invention.
Figure 9B:
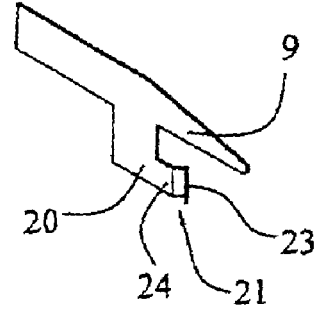

In order to prevent the engagement element 20 in forward position from deviating laterally and disengage unintentionally from the seat 17 made on the stiff element 16 due to the stress it undergoes, although the anchoring of the engagement element 20 to the housing body 13 is sufficiently stiff, the discharging means 19 can advantageously comprise anti-deviation means 21. Said means 21 can include for instance a transversal rod 22 associated with the engagement elements 20, as can be seen in FIG. 8, or engagement elements 20 having a folded extension 23 associated to an end portion 24 thereof, as shown in FIGS. 9a and 9b.

The linear knitting machine 1 according to the present invention can further be single-needlebed or double-needlebed: in the latter case the holding-down means 8, the discharging means 19 and the holding means 15 described above are associated to each one of the two needlebeds 3. As a matter of fact, as can be seen schematically in FIGS. 5 and 5a, the machine 1 is equipped with two bars 11 designed to carry the holding-down elements 9 with their engagement elements 20, each being associated with one of the two needlebeds 3.

As for known machines, the knitting machine 1 according to the present invention comprises means for feeding the needles 4 with the yarn for forming new fabric, comprising a plurality of yarn-carrying elements, commonly known as "yarn guide", which make enveloping movements around the needle 4 so that the yarn is taken and kept in the jack 6 of the needle 4 itself and then woven in the loop previously formed (feature not shown).

Furthermore, the machine 1 comprises means for taking down the fabric already formed (not shown), cooperating with the holding-down means 8 so as to prevent the stitches of said fabric from getting up along the stem 5 of the needle 4 when said needle 4 is lifted. Said means comprise at least two rollers, preferably three, designed to exert a basically constant pressure on the fabric already formed.

Eventually, the machine 1 can advantageously comprise stopping means (not shown) acting upon the various needles 4 so as to avoid the unintentional closing of the corresponding latch when they are getting up, which would prevent the jack 6 from being fed with the new yarn.

The invention thus conceived can undergo several changes and variants, all of which fall within the inventive framework.

In practice, any material or size can be used depending on the various needs.

Moreover, all details can be replaced by other technically equivalent elements.

The invention achieves important advantages.

The linear knitting machine according to the invention enables to discharge onto the needlebed, or more generally onto a stiff element associated with the machine frame, the force of friction building up when keeping the stitch basically at the same height as the needlebed when the needle gets up. In the preferred embodiment of the invention, said force is discharged even for every single needle, and therefore in a uniform way basically on the whole length of the needlebed. Thus, the bar carrying the holding-down elements and the engagement elements should bear the weight only of the elements it carries but not the stress upward which would inevitably tend to bend it.

This results in huge advantages concerning the mechanical construction of the machine, the textile yield, the stability of the system, the increase of the overall speed of the machine (in number of shots per minutes) and the optimization of take-down operations. As a matter of fact, for instance, the bar carrying the holding-down elements and the engagement elements becomes less strong with a decrease in strength and overall size of the machine and benefits concerning costs, especially manufacturing costs, manufacturing speeds, since the inertia of the masses involved is lower, and easy trans-port and installation in a manufacturing plant. Furthermore, the fact the bar carrying the holding-down elements and the engagement elements undergoes a lower stress implies a longer life of the components forming the holding-down means 8 and the discharging means. Moreover, the machine disclosed above ensures an efficient system for preventing the stitch just formed from getting up together with the needle, which significantly reduces the risk of breaking the needles and enables the take-down means not to work above their limits. This allows to preserve the quality of the manufactured fabric, and in particular not to create on the latter stress areas, abnormal extensions or torsions.

The invention claimed is:

1. A linear knitting machine (1) comprising:
    a machine frame, at least one needlebed (3) associated and integral with said machine frame, a plurality of needles (4) sliding in said needlebed (3), means for feeding said needles (4) with a yarn for building a new stitch and holding-down means (8) cooperating with said needles (4) on said needlebed (3) and moving between a forward position, which occurs when said needle (4) is lifted in said needlebed (3), in which said holding-down means act upon said stitch so as to keep said stitch on a stem (5) of said needle (4), and a rear position, when said needle (4) gets down, in which said holding-down means do not act upon said stitch;

characterized in that it further comprises:

holding means (15) fastened to said machine frame and discharging means (19), associated with said holding-down means (8), which can be engaged with said holding means (15) in said forward position for discharging onto said machine frame a force generated by said holding-down means (8) when keeping said stitch, and which can be disengaged from said holding means (15) in said rear position.

2. The machine (1) according to claim 1, characterized in that said holding-down means (8) comprise a plurality of holding-down elements (9), each of said holding-down elements (9) being designed to cooperate with one of said needles (4) on said needlebed (3) for keeping said stitch.

3. The machine (1) according to claim 2, characterized in that each of said holding-down elements (9) in said rear position is designed to fit into a space (10) between two of said adjacent needles (4) for keeping said stitch.

4. The machine (1) according to claim 2, characterized in that said holding-down means (8) further comprise a bar (11) movably associated with said machine frame by means of at least one arm (12) for shifting between said forward position and said rear position through handling means.

5. The machine (1) according to claim 4, characterized in that said holding-down elements (9) are connected to and integral with said bar (11).

6. The machine (1) according to claim 4, characterized in that said holding-down means (8) further comprise a plurality of housing bodies (13) connected to and integral with said bar (11), each of them being designed to house a pre-established number of said holding-down elements (9), said holding-down elements (9) being connected to and integral with said housing bodies (13).

7. The machine (1) according to claim 1, characterized in that said discharging means (19) comprise at least one engagement element (20) associated and integral with said holding-down means (8) for engaging in said forward position with said holding means (15).

8. The machine (1) according to claim 4, characterized in that said discharging means (19) comprise at least one engagement element (20) associated and integral with said holding-down means (8) for engaging in said forward position with said holding means (15), and further characterized in that said at least one engagement element (20) is associated with said at least one arm (12).

9. The machine (1) according to claim 4, characterized in that said discharging means (19) comprise at least one engagement element (20) associated and integral with said holding-down means (8) for engaging in said forward position with said holding means (15), and further characterized in that said at least one engagement element (20) is associated with said bar (11).

10. The machine (1) according to claim 6, characterized in that said discharging means (19) comprise at least one engagement element (20) associated and integral with said holding-down means (8) for engaging in said forward position with said holding means (15), and further characterized in that said at least one engagement element (20) is associated with at least one of said housing bodies (13).

11. The machine (1) according to claim 10, characterized in that it comprises a plurality of engagement elements (20), each of them being associated with each one of said housing bodies (13).

12. The machine (1) according to claim 2, characterized in that said discharging means (19) comprise at least one engagement element (20) associated and integral with said holding-down means (8) for engaging in said forward position with said holding means (15), and further characterized in that it comprises a plurality of engagement elements (20), each of them being associated with one of said holding-down elements (9) for engaging with said holding means (15) in said forward position so as to discharge said force generated by said holding-down means (8) when keeping said stitch for every single needle (4).

13. The machine (1) according to claim 12, characterized in that each of said holding-down elements (9) is made as one piece with each of said engagement elements (20).

14. The machine (1) according to claim 1, characterized in that said holding means (15) comprise a stiff element (16).

15. The machine (1) according to claim 14, characterized in that said engagement elements (20) are designed to engage into suitable seats (17) obtained on said stiff element (16) when shifting from said rear to said forward position, to stay in said seats (17) in forward position and to disengage from said seats (17) when shifting from said forward to said rear position.

16. The machine (1) according to claim 14, characterized in that said stiff element (16) is associated with said needlebed (3).

17. The machine (1) according to claim 14, characterized in that said stiff element (16) is made up of said needlebed (3).

18. The machine (1) according to claim 1, characterized in that said discharging means (19) further comprise anti-deviation means (21) designed to prevent said engagement elements (20) from unintentionally disengaging from said stiff element (16) in said forward position.

19. The machine (1) according to claim 18, characterized in that said anti-deviation means (21) comprise a transversal rod (22) associated with said plurality of engagement elements (20).

20. The machine (1) according to claim 18, characterized in that said anti-deviation means (21) comprise a folded extension (23) associated with an end portion (24) of said engagement elements (20).

21. The machine (1) according to claim 1, characterized in that it comprises two of said needlebeds (3) and in that said holding-down means (8), said discharging means (19) and said holding means (15) are associated with each one of said two needlebeds (3).

22. The machine (1) according to claim 1, characterized in that it further comprises means for taking down a fabric that has already been formed, cooperating with said holding-down means (8) so as to prevent said stitches of said fabric from getting up along said stem (5) of said needle (4) when said needle (4) is lifted.

* * * * *